(12) United States Patent
Griffin et al.

(10) Patent No.: US 9,223,948 B2
(45) Date of Patent: *Dec. 29, 2015

(54) COMBINED PASSCODE AND ACTIVITY LAUNCH MODIFIER

(75) Inventors: Jason Tyler Griffin, Kitchener (CA); Alistair Robert Hamilton, Sammanish, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 190 days.

This patent is subject to a terminal disclaimer.

(21) Appl. No.: 13/286,652

(22) Filed: Nov. 1, 2011

(65) Prior Publication Data

US 2013/0111581 A1   May 2, 2013

(51) Int. Cl.
*G06F 3/0488* (2013.01)
*G06F 21/31* (2013.01)
*G06F 21/62* (2013.01)

(52) U.S. Cl.
CPC ............ *G06F 21/31* (2013.01); *G06F 3/04883* (2013.01); *G06F 21/629* (2013.01)

(58) Field of Classification Search
CPC combination set(s) only.
See application file for complete search history.

(56) References Cited

U.S. PATENT DOCUMENTS

| | | | |
|---|---|---|---|
| 4,494,114 A | 1/1985 | Kaish | |
| 5,537,544 A * | 7/1996 | Morisawa et al. | 726/19 |
| 5,559,961 A | 9/1996 | Blonder | |
| 5,699,514 A | 12/1997 | Durinovic-Johri et al. | |
| 5,821,933 A | 10/1998 | Keller et al. | |
| 5,923,841 A | 7/1999 | Lee | |
| 6,070,796 A | 6/2000 | Sirbu | |
| 6,118,872 A | 9/2000 | Kashima et al. | |
| 6,151,609 A * | 11/2000 | Truong | 715/205 |
| 6,209,104 B1 | 3/2001 | Jalili | |
| 6,686,931 B1 | 2/2004 | Bodnar | |
| 6,721,891 B1 | 4/2004 | Borza | |
| 6,801,765 B1 | 10/2004 | Roo et al. | |
| 6,862,687 B1 | 3/2005 | Suzuki | |
| 6,892,081 B1 | 5/2005 | Elomaa | |
| 6,931,539 B2 | 8/2005 | Walia | |
| 6,950,949 B1 | 9/2005 | Gilchrist | |
| 7,069,580 B1 | 6/2006 | Deitz et al. | |
| 7,124,300 B1 | 10/2006 | Lemke | |
| 7,124,433 B2 | 10/2006 | Little | |
| 7,136,514 B1 | 11/2006 | Wong | |
| 7,376,899 B2 | 5/2008 | Mantyla | |
| 7,453,443 B2 | 11/2008 | Rytivaara et al. | |
| 7,659,869 B1 | 2/2010 | Bauchot et al. | |

(Continued)

FOREIGN PATENT DOCUMENTS

| | | |
|---|---|---|
| CN | 1547688 | 11/2004 |
| CN | 101282217 | 10/2008 |

(Continued)

OTHER PUBLICATIONS

Examination report mailed on Sep. 18, 2012 from related European patent application No. 111873692.6.

(Continued)

*Primary Examiner* — Taghi Arani
*Assistant Examiner* — Phy Anh Vu
(74) *Attorney, Agent, or Firm* — Fish & Richardson P.C.

(57) ABSTRACT

A method and system are disclosed whereby an activity launch modifier is combined with a passcode. The activity launch modifier is used to determine a portion of an application to activate upon valid authentication.

17 Claims, 4 Drawing Sheets

(56) References Cited

U.S. PATENT DOCUMENTS

| | | | |
|---|---|---|---|
| 7,720,307 B2 | 5/2010 | Iizuka | |
| RE41,922 E | 11/2010 | Gough et al. | |
| 7,992,202 B2 | 8/2011 | Won et al. | |
| 8,111,134 B2 | 2/2012 | Faith et al. | |
| 8,229,250 B2 | 7/2012 | Suzuki et al. | |
| 8,458,485 B2 | 6/2013 | Bandyopadhyay et al. | |
| 8,483,518 B2 | 7/2013 | Zhu et al. | |
| 2002/0029341 A1 | 3/2002 | Juels et al. | |
| 2003/0193512 A1 | 10/2003 | Komagata | |
| 2004/0004616 A1 | 1/2004 | Konya et al. | |
| 2004/0010721 A1 | 1/2004 | Kirovski et al. | |
| 2004/0010722 A1 | 1/2004 | Ha | |
| 2004/0030933 A1 | 2/2004 | Park | |
| 2004/0098595 A1 | 5/2004 | Aupperle et al. | |
| 2004/0168068 A1* | 8/2004 | Goal et al. | 713/184 |
| 2004/0260955 A1* | 12/2004 | Mantyla | 713/202 |
| 2005/0039027 A1 | 2/2005 | Shapiro | |
| 2005/0070276 A1 | 3/2005 | McGarry | |
| 2005/0116840 A1 | 6/2005 | Simelius | |
| 2005/0169503 A1 | 8/2005 | Howell et al. | |
| 2005/0201638 A1 | 9/2005 | Cha | |
| 2005/0251752 A1 | 11/2005 | Tan et al. | |
| 2005/0251866 A1* | 11/2005 | Kobayashi et al. | 726/27 |
| 2006/0031289 A1 | 2/2006 | Experton | |
| 2006/0048236 A1* | 3/2006 | Multerer et al. | 726/28 |
| 2006/0075256 A1 | 4/2006 | Hagiwara et al. | |
| 2006/0189345 A1 | 8/2006 | Suzuki et al. | |
| 2006/0190724 A1 | 8/2006 | Adams et al. | |
| 2006/0206717 A1 | 9/2006 | Holt et al. | |
| 2006/0206919 A1 | 9/2006 | Montgomery et al. | |
| 2006/0215360 A1 | 9/2006 | Lin et al. | |
| 2006/0217064 A1 | 9/2006 | Glass et al. | |
| 2006/0238517 A1 | 10/2006 | King et al. | |
| 2006/0288182 A1 | 12/2006 | Chou et al. | |
| 2007/0011461 A1 | 1/2007 | Jeng | |
| 2007/0015490 A1* | 1/2007 | Munje et al. | 455/410 |
| 2007/0032267 A1 | 2/2007 | Haitani et al. | |
| 2007/0139714 A1* | 6/2007 | McElvain | 358/3.06 |
| 2007/0150826 A1* | 6/2007 | Anzures et al. | 715/772 |
| 2007/0150842 A1 | 6/2007 | Chaudhri et al. | |
| 2007/0167196 A1 | 7/2007 | Yamashita et al. | |
| 2007/0180515 A1 | 8/2007 | Danilak | |
| 2007/0195998 A1 | 8/2007 | Le Saint et al. | |
| 2007/0234235 A1 | 10/2007 | Scott | |
| 2007/0250897 A1* | 10/2007 | Pearson | 725/135 |
| 2007/0250934 A1 | 10/2007 | Park | |
| 2007/0277224 A1 | 11/2007 | Osborn et al. | |
| 2008/0016371 A1 | 1/2008 | Jiang et al. | |
| 2008/0060052 A1 | 3/2008 | Hwang et al. | |
| 2008/0092245 A1 | 4/2008 | Alward et al. | |
| 2008/0108323 A1 | 5/2008 | Abe et al. | |
| 2008/0113791 A1 | 5/2008 | Williams et al. | |
| 2008/0127302 A1 | 5/2008 | Qvarfordt et al. | |
| 2008/0162338 A1* | 7/2008 | Samuels et al. | 705/38 |
| 2008/0165153 A1 | 7/2008 | Platzer et al. | |
| 2008/0201578 A1 | 8/2008 | Drake | |
| 2008/0209223 A1 | 8/2008 | Nandy et al. | |
| 2008/0244700 A1 | 10/2008 | Osborn et al. | |
| 2009/0012880 A1 | 1/2009 | Tortola | |
| 2009/0037986 A1 | 2/2009 | Baker | |
| 2009/0038006 A1 | 2/2009 | Traenkenschuh et al. | |
| 2009/0046856 A1 | 2/2009 | Mitchell | |
| 2009/0046929 A1 | 2/2009 | De Leon | |
| 2009/0077653 A1 | 3/2009 | Osborn et al. | |
| 2009/0138723 A1 | 5/2009 | Nyang et al. | |
| 2009/0160800 A1 | 6/2009 | Liu et al. | |
| 2009/0185033 A1* | 7/2009 | Nozaki | 348/77 |
| 2009/0187986 A1 | 7/2009 | Ozeki | |
| 2009/0224874 A1 | 9/2009 | Dewar et al. | |
| 2009/0293119 A1 | 11/2009 | Jonsson | |
| 2009/0300732 A1 | 12/2009 | Hwang et al. | |
| 2009/0313693 A1 | 12/2009 | Rogers | |
| 2009/0320124 A1 | 12/2009 | Taxier et al. | |
| 2009/0328175 A1 | 12/2009 | Shuster | |
| 2010/0037313 A1 | 2/2010 | Tomeny | |
| 2010/0040293 A1 | 2/2010 | Hermann et al. | |
| 2010/0043062 A1 | 2/2010 | Alexander et al. | |
| 2010/0050242 A1 | 2/2010 | Delia et al. | |
| 2010/0058423 A1* | 3/2010 | Yaussy et al. | 725/118 |
| 2010/0064376 A1 | 3/2010 | Vladimirovitch et al. | |
| 2010/0102941 A1 | 4/2010 | Richter et al. | |
| 2010/0107067 A1 | 4/2010 | Vaisanen | |
| 2010/0138297 A1 | 6/2010 | Fitzgerald et al. | |
| 2010/0138914 A1 | 6/2010 | Davis et al. | |
| 2010/0169958 A1 | 7/2010 | Werner et al. | |
| 2010/0180336 A1 | 7/2010 | Jones et al. | |
| 2010/0205667 A1 | 8/2010 | Anderson et al. | |
| 2010/0221694 A1* | 9/2010 | Moshenberg | 434/362 |
| 2010/0287382 A1 | 11/2010 | Gyorffy et al. | |
| 2010/0306718 A1 | 12/2010 | Shim et al. | |
| 2010/0322485 A1 | 12/2010 | Riddiford | |
| 2010/0333198 A1 | 12/2010 | Mikake | |
| 2011/0047368 A1 | 2/2011 | Sundaramurthy et al. | |
| 2011/0096997 A1 | 4/2011 | Marciszko et al. | |
| 2011/0202982 A1 | 8/2011 | Alexander et al. | |
| 2011/0289576 A1 | 11/2011 | Cheng | |
| 2012/0011564 A1 | 1/2012 | Osborn et al. | |
| 2012/0023574 A1 | 1/2012 | Osborn et al. | |
| 2012/0159593 A1 | 6/2012 | Griffin et al. | |
| 2012/0159608 A1 | 6/2012 | Griffin et al. | |
| 2012/0159613 A1 | 6/2012 | Griffin et al. | |
| 2012/0159614 A1* | 6/2012 | Griffin et al. | 726/19 |
| 2012/0159615 A1 | 6/2012 | Griffin et al. | |
| 2012/0159616 A1 | 6/2012 | Griffin et al. | |
| 2012/0167199 A1 | 6/2012 | Riddiford | |
| 2012/0291120 A1 | 11/2012 | Griffin | |
| 2013/0174094 A1* | 7/2013 | Heo et al. | 715/835 |
| 2014/0192245 A1* | 7/2014 | Lee et al. | 348/333.05 |

FOREIGN PATENT DOCUMENTS

| | | |
|---|---|---|
| CN | 102804195 | 11/2012 |
| EP | 0677801 | 10/1995 |
| EP | 0763791 | 3/1997 |
| EP | 0901060 A2 | 3/1999 |
| EP | 1422589 A1 | 5/2004 |
| EP | 1816580 | 8/2007 |
| EP | 1816580 A1 | 8/2007 |
| EP | 1845474 | 10/2007 |
| EP | 2000939 A2 | 12/2008 |
| EP | 2254071 A1 | 11/2010 |
| GB | 2324004 | 10/1998 |
| GB | 2324004 A | 10/1998 |
| JP | 2001092785A A | 4/2001 |
| TW | 1268690 | 12/2006 |
| WO | WO0198924 A1 | 12/2001 |
| WO | WO0199338 A1 | 12/2001 |
| WO | WO03048909 A2 | 6/2003 |
| WO | WO2004027632 A1 | 4/2004 |
| WO | WO2005029216 A2 | 3/2005 |
| WO | WO2006073313 A1 | 7/2006 |
| WO | WO2007098569 A1 | 9/2007 |
| WO | WO2008124708 A2 | 10/2008 |
| WO | WO2008132724 | 11/2008 |
| WO | WO2009022242 A1 | 2/2009 |
| WO | WO2009150655 A1 | 12/2009 |
| WO | 2010/146352 | 12/2010 |
| WO | 2010/146353 | 12/2010 |
| WO | 2010137859 | 12/2010 |

OTHER PUBLICATIONS

Office Action mailed Sep. 21, 2011 from related U.S. Appl. No. 12/325,568.

Examination Report mailed Jan. 28, 2011 from related European patent application No. 08170378.7.

Office Action mailed Feb. 29, 2012 from related U.S. Appl. No. 12/325,568.

Extended European Search Report mailed Jul. 13, 2009 from related European patent application No. 08170378.7.

Office Action mailed Nov. 10, 2011 from related Canadian patent application No. 2,686,689.

Extended European Search Report mailed Jul. 13, 2011 from related European patent application No. 11156694.9.

(56) References Cited

OTHER PUBLICATIONS

Extended European Search Report dated Apr. 3, 2012 issued on related European patent application No. 11187362.6; 5 pages.
BlackBerry Smart Card Reader Getting Started Guide, Version 1.5, Oct. 30, 2012, 30 pages.
Microsoft; "Getting Started: Microsoft Fingerprint Reader," XP55072102A, May 19, 2004, 14 pages.
NTT DoCoMo; "Manual for FOMA F903i"; Jun. 2010; 567 pages.
Pantech: "Its Different PG-6200 User's Manual"; Korea; 60 pages.
Rambling Thoughts Blog' [online]. Bhatt, "Nokia Mobile Phone Unlock and Hidden Feattures Code," Mar. 30, 2007, [retrieved on Aug. 24, 2010], Retrieved from the Internet: URL<http://www.bhatt.id.au/blog/nokia-mobile-phone-service-codes-activate-hidden-features/>, 30 pages.
SAP NetWeaver 2004 SPS23, "Defining User-Specific Data Filtering".
SAP NetWeaver, "Multiple Usage of a Mobile Device"; 1 page.
ThinkVantage; "ThinkVantage Technologies Deployment Guide"; May 31, 2006; 192 page, Retrieved from the Internet: URL:<http://download.lenovo.com/ibmdl/pub/pc/pccbbs/thinkcentre_pdf/rr30mst.pdf>.
Wikipedia' [online], "SecurID," May 29, 2011, Retrieved from the Internet: URL<https://en.wikipedia.org/w/index.php?title=RSA_SecurID&redirect=no>, 5 pages.
Wilson et al. "Simple Test Procedure for Image-Based Biometric Verification Systems"; Jan. 1, 1999, 9 pages.
Zeilenga, Kurt D., "Multiple Passwords per User in XMPP", Mar. 2, 2009; 5 pages.
Microsoft Windows XP Unleashed, Chapter 5: Installing and Running Applications, Dec. 1, 2001, pp. 122-129, XP55071160.
Canadian Office Action in Canadian Application No. 2,686,689, dated Apr. 11, 2013, 3 pages.
Canadian Office Action in Canadian Application No. 2,686,689, dated Mar. 11, 2014, 3 pages.
Canadian Office Action in Canadian Application No. 2,686,689, dated Nov. 10, 2011, 3 pages.
Canadian Office Action in Canadian Application No. 2,769,389, dated Jul. 23, 2014, 5 pages.
Canadian Office Action in Canadian Application No. 2,769,389, dated Oct. 1, 2013, 3 pages.
European Communication Pursuant to Article 94(3) in European Application No. 08170378.7, dated Feb. 21, 2014, 7 pages.
European Communication Pursuant to Article 94(3) in European Application No. 08170378.7, dated Jan. 28, 2011, 1 page.
European Communication Pursuant to Article 94(3) in European Application No. 08170378.7, dated Mar. 4, 2013, 5 pages.
European Communication Pursuant to Article 94(3) in European Application No. 13152924.0, dated May 19, 2015, 5 pages.
European Summons to Attend Oral Proceedings in European Application No. 08170378.7, dated Nov. 9, 2011, 6 pages.
Extended European Search Report in European Application No. 08170378.7, dated Jul. 13, 2009, 5 pages.
Extended European Search Report in European Application No. 11156694.9, dated Jul. 13, 2011, 6 pages.
Extended European Search Report in European Application No. 11187362.6, dated Apr. 3, 2012, 5 pages.
Extended European Search Report in European Application No. 13152924.0, dated Dec. 6, 2013, 12 pages.
Partial European Search Report in European Application No. 13152924.0, dated Aug. 5, 2013, 8 pages.
United States Office Action in U.S. Appl. No. 12/325,568, dated Dec. 23, 2013, 24 pages.
United States Office Action in U.S. Appl. No. 12/325,568, dated Sep. 21, 2011, 27 pages.
United States Office Action in U.S. Appl. No. 12/325,568, dated Feb. 29, 2012, 15 pages.
United States Advisory Action in U.S. Appl. No. 12/325,568, dated Apr. 17, 2012, 4 pages.
United States Office Action in U.S. Appl. No. 12/325,568, dated Jan. 23, 2013, 22 pages.
United States Office Action in U.S. Appl. No. 12/325,568, dated May 15, 2013, 18 pages.
United States Office Action in U.S. Appl. No. 13/615,933, dated Feb. 21, 2014, 15 pages.
United States Office Action in U.S. Appl. No. 13/038,640, dated Oct. 25, 2012, 24 pages.
United States Office Action in U.S. Appl. No. 13/038,640, dated Jun. 5, 2013, 18 pages.
United States Advisory Action in U.S. Appl. No. 13/038,640, dated Aug. 29, 2013, 6 pages.
Sobrado, L. & Birget, J. C.; "Shoulder-Surfing resistant graphical passwords—Draft" New Jersey, USA;Apr. 11, 2005 pp. 1-8.
Kim, David et al.; Multi-Touch Authentication on Tabletops:http//homepages.cs.ncl.ac.uk/david.kim/multi-touch_authentication;online;printed Mar. 10, 2011, 6 pages.
Tan et al.; Spy-Resistant keyboard: More Secure Password Entry on Public Touch Screen Displays; Microsoft Research; 10 pages.
Hoanca et al.; Screen oriented technique for reducing the incidence of shoulder surfing;Proceedings of International Conference of Security of Information and Networks, 2005—Citeseer;pp. 1-7.
Sobrado, L. et al., "Graphical Passwords", 2002, The Rutgers Scholar: An Electronic Bulletin of Undergraduate Research, vol. 4, pp. 1-10.
Gossweiler et al., "Whets Up CAPTCHA? A CAPTCHA Based on . . . "; Apr. 20, 2009.
Feng et al. "Recognition of head-and-shoulder face image using virtual Frontal-view image"; Nov. 2000.
Al-Baker et al. "A GPRS-based remote human face identification system for handheld devices"; Mar. 6, 2005.
Office Action issued in Canadian Application No. 2,793,441 on Jun. 2, 2014.

\* cited by examiner

COMBINED PASSCODE AND ACTIVITY LAUNCH MODIFIER

TECHNICAL FIELD

The present disclosure relates generally to methods and systems for unlocking electronic devices.

BACKGROUND

Passwords may be used in many situations to authenticate a user before using a portion of an electronic device. Situations requiring authentication may include the ability to access or use a computer, mobile phone, tablet device, PDA (Personal Digital Assistant), or any other device. Authentication may also enable access to a physical location, or allow use of a credit/debit card or similar instrument. Passwords are typically alpha-numeric strings or sequences entered on a keyboard. However, with the advent of touch sensitive input devices, graphical authentication systems are also available. For example, a user may have to align icons on a display or touch certain images in a particular order in order to authenticate.

There are many actions that users repeat frequently on their devices, such as macros within an application. Likewise, there are other actions that are not used commonly due to the amount of time or effort to access the actions. Examples of actions repeated frequently include entering a BBM (Blackberry Messager™) conversation with a particular person, checking a particular website, making a phone call and sending an email. Examples of actions that may not be used as frequently as desired due to the time or effort involved might include taking a picture, recording a voice note and opening a document stored on the electronic device. Today these actions can be tedious because of the traditional access steps of unlock/wakeup, enter password, open application, and activate the action within the application.

Providing shortcuts for specific actions outside of a password is known. However shortcuts can create security holes. By giving access to an application outside a security screen there is a risk that the devices data can be accessed or unlocked through the application. In some situations, shortcuts can create a very limited set of actions where the user is not able to access any data on the device. For example, a shortcut might allow the user to take a picture but not for communicate with someone over BBM.

There are examples of devices that provide access to a limited set of functions outside of a password. For example, on some smart phones, you can answer a phone call without entering a password.

BRIEF DESCRIPTION OF THE DRAWINGS

Like reference numerals are used in the drawings to denote like elements and features.

DETAILED DESCRIPTION OF EXAMPLE EMBODIMENTS

Typically, authentication systems restrict access by requiring a user to authenticate before permitting access to a system or application. Some systems require a user to re-authenticate after a period of time. The present application combines a password/unlock action with a shortcut command to a specific action/macro. Examples of password/unlock are Clixel™, entering a code on a number pad (virtual or real), entering a password on a qwerty keyboard (virtual or real), and gesture passwords. Clixel™ is a graphical authentication system in which a point from an overlay image must be aligned with a point on a base image in order to authenticate. In embodiments described herein, a modifier or activity launch modifier is combined with the password/unlock process to trigger a macro/shortcut that is defined for an action the user wants to take. For example, if the user's password is "qwerty" he or she can access the device in a traditional way be typing "qwerty" then enter. If the user wants to take a voice note immediately, the authentication process might be set up so that the user can type "qwertyv" then enter and the voice note application will automatically open. If the user wants to be placed in a BBM conversation with his wife, for example, the system might be set up so that "qwertyw" can be input followed by enter and the BBM conversation will automatically be started. For a Clixel™ example where you are moving an element (number or symbol) to a target, the modifier might be in how you get it there, for example, the modifier could be moving the element in clearly clockwise or counter clockwise directions, or possibly using multi-touch to move the element. For example, the relative location of two fingers on a touch screen might be the modifier to allow for different commands. In a numerical pass code, the first or last number can be used as a modifier to provide different commands. In this case the security level is decreased because one digit is used as the activity launch modifier. However, in some cases this decrease in security might be an acceptable trade-off for the convenience. In a pass code or password a gesture on the final letter/number might provide the modifier. In other embodiments, a fingerprint scanner might be set up so the direction in which a finger is scanned is the modifier.

In some embodiments, the modifier is indicative of an activity for which a shortcut is created. One or more activity launch modifiers can be factory preset in some embodiments. Alternatively or in addition to factory preset activity launch modifiers, some embodiments allow for users to set user-defined activity launch modifiers. In other words, users can create customize activity launch modifiers to combine with a passcode to create shortcuts to applications, portions of applications or actions within applications.

In one aspect, there is provided a method of activating an application on an electronic device comprising: receiving passcode input data from a user-interface, the passcode input data including a passcode combined with an activity launch modifier; checking the passcode input data for a valid passcode for operating the electronic device; determining a corresponding application for the activity launch modifier; and activating the corresponding application if the passcode input data includes the valid passcode.

In another aspect, there is provided a computer readable medium having computer readable instructions stored thereon that when implemented cause a processor to implement a method of activating an application on an electronic device, the comprising: receiving passcode input data from a user-interface, the passcode input data including a passcode combined with an activity launch modifier; checking the passcode input data for a valid passcode for operating the electronic device; determining a corresponding application for the activity launch modifier; and activating the corresponding application if the passcode input data includes the valid passcode.

In another aspect, there is provided an electronic system comprising: a processor; an input interface; a memory having computer readable instruction stored thereon that when executed cause the processor to implement a method of activating an application comprising: receiving passcode input data from the user-interface, the passcode input data including a passcode combined with an activity launch modifier; checking the passcode input data for a valid passcode for operating at least a portion of the electronic system; determining a corresponding application for the activity launch modifier; and activating the corresponding application if the passcode input data includes the valid passcode.

Non-limiting examples of a passcode include a password, an unlock code and a graphical authentication process. The passcode can be for operating or accessing at least a portion of the electronic device.

Figure 1:
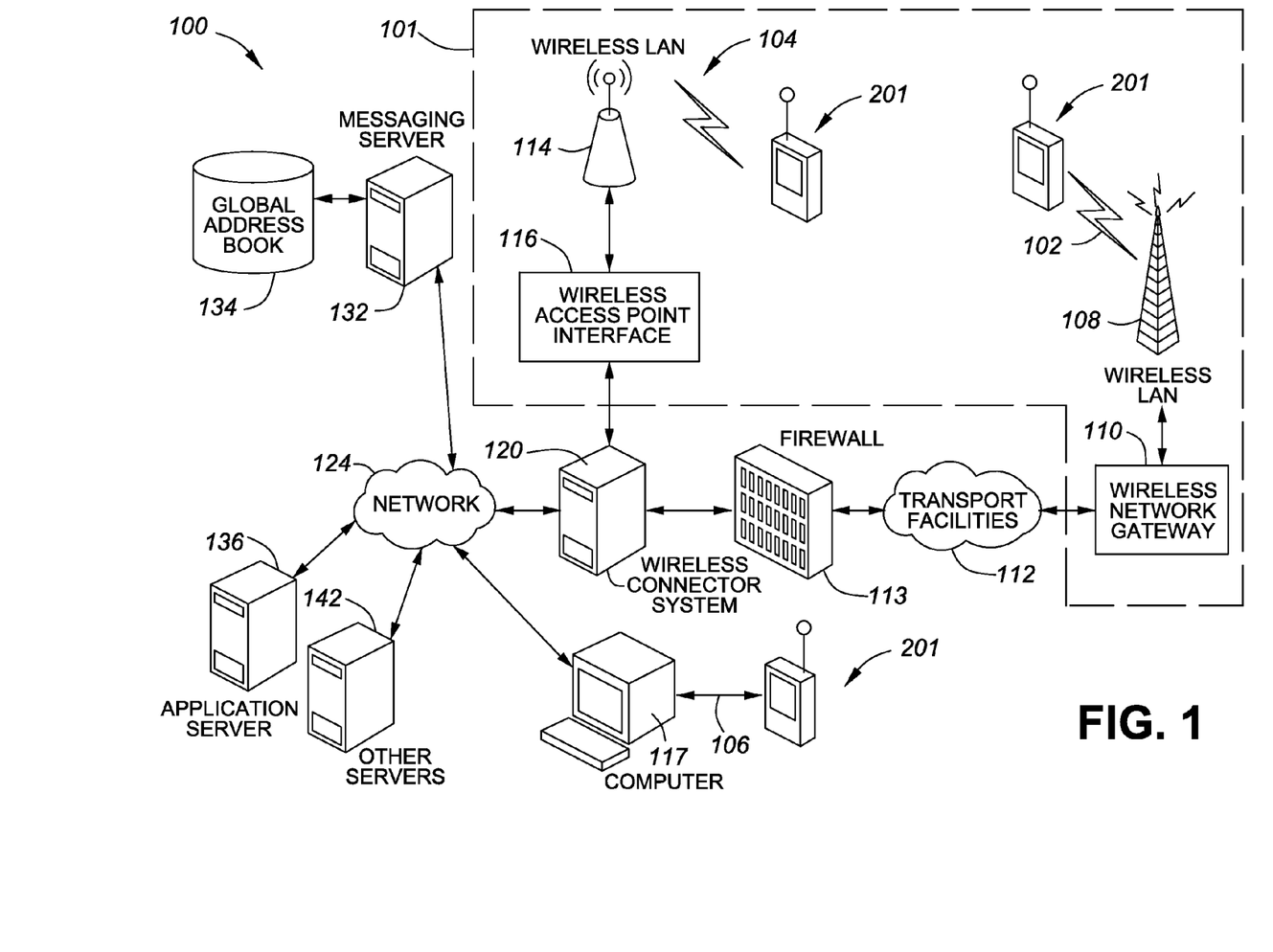
FIG. 1 is a block diagram illustrating a communication system including a mobile communication device in which example embodiments of the present disclosure can be applied.

Reference is first made to FIG. 1 which shows in block diagram of a communication system 100 in which example embodiments of the present disclosure can be applied. The communication system 100 comprises a number of mobile electronic devices 201 which may be connected to the remainder of system 100 in any of several different ways. Accordingly, several instances of mobile electronic devices 201 are depicted in FIG. 1 employing different example ways of connecting to system 100. Mobile electronic devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile electronic devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile electronic devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile electronic devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile electronic devices 201 and other devices (not shown) connected, directly or indirectly, to the WWAN 102. Accordingly, communications sent via the mobile electronic devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile electronic devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile electronic devices 201. The wireless connector system 120 also provides administrative control and management capabilities over users and mobile electronic devices 201 which may connect to the wireless connector system 120.

The wireless connector system 120 allows the mobile electronic devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile electronic devices 201 in the wireless network 101, an authentication server and an application server for implementing server-based applications.

The global address book 134 comprises electronic contact records generated and maintained by an IT (information technology) administrator of the network 124. Typically, the global address book is maintained exclusively by the messaging server 132 and there is no local copy on the mobile electronic device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile electronic devices 201. In some embodiments, communications between the wireless connector system 120 and the mobile electronic devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile electronic device 201 over the WWAN 102 to the wireless connector system 120. The wireless connector system 120 then sends the data packets to the appropriate connection point such as the messaging server 132, other servers 142 or application servers 136. Conversely, the wireless connector system 120 sends data packets received, for example, from the messaging server 132 or other servers 142 to the wireless network gateway 110 which then transmit the data packets to the destination mobile electronic device 201. The AP interfaces 116 of the WLAN 104 provide similar sending functions between the mobile electronic device 201, the wireless connector system 120 and network connection point such as the messaging server 132, other servers 142 and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile electronic device 201 may alternatively connect to the wireless connector system 120 using a computer 117 via the network 124. In at least some embodiments, for security purposes the computers 117 with which the mobile electronic devices 201 can connect to the wireless connector system 120 are limited to computers 117 which are directly connected to the network 124. A link 106 may be provided for exchanging information between the mobile electronic device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile electronic device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile electronic devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
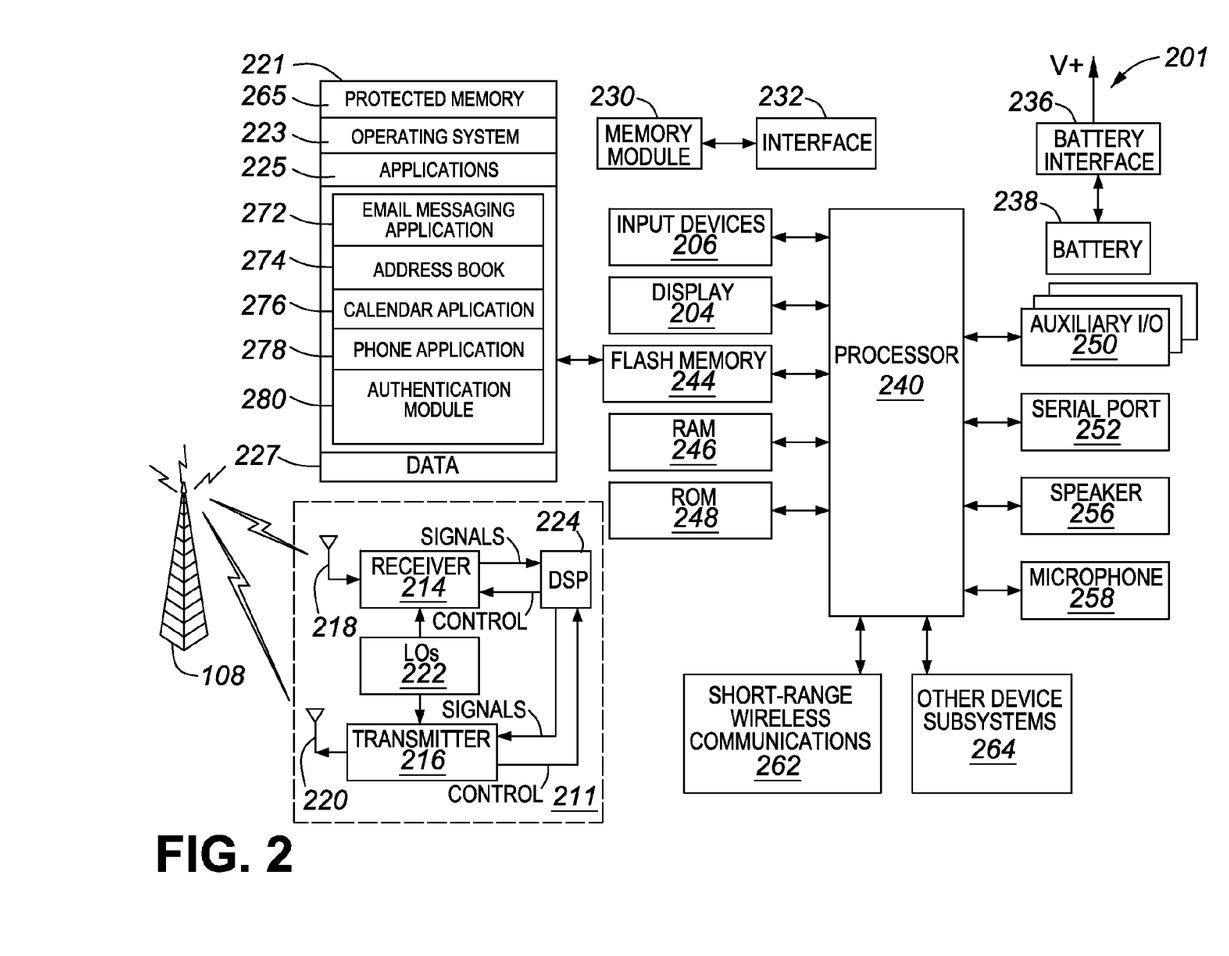
FIG. 2 is a block diagram illustrating a mobile communication device in accordance with one example embodiment of the present disclosure.

Reference is now made to FIG. 2 which illustrates an exemplary embodiment of the mobile electronic device 201 in which example embodiments described in the present disclosure can be applied. The mobile electronic device 201 is a two-way communication device having data and voice communication capabilities, and the capability to communicate with other computer systems, for example, via the Internet. Depending on the functionality provided by the mobile electronic device 201, in various embodiments the mobile electronic device 201 may be a multiple-mode communication device configured for both data and voice communication, a smartphone, a mobile telephone or a PDA (personal digital assistant) enabled for wireless communication, a tablet device or a computer system with a wireless modem.

The mobile electronic device 201 includes a rigid case (not shown) housing the components of the mobile electronic device 201. The internal components of the mobile electronic device 201 are constructed on a printed circuit board (PCB). The mobile electronic device 201 includes a controller comprising at least one processor 240 (such as a microprocessor) which controls the overall operation of the mobile electronic device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen and a touchscreen, input devices 206 such as a keyboard, a touchpad, a fingerprint sensor and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The mobile electronic device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations 108 of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and an authentication module 280. The authentication module 280 includes instructions for implementing any of the methods described herein. It is recognized that the authentication module 280 and its various components as described herein can form a discrete module running on the mobile electronic device 201, or the functions of the authentication module 280 can be distributed on the mobile electronic device 201 as separate modules or integrated within other existing modules as desired. Such discrete or distributed implementations all fall within the embodiments of the authentication module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the mobile electronic device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the mobile electronic device 201, while continuing to fall within the term phone application 278.

Figure 3:
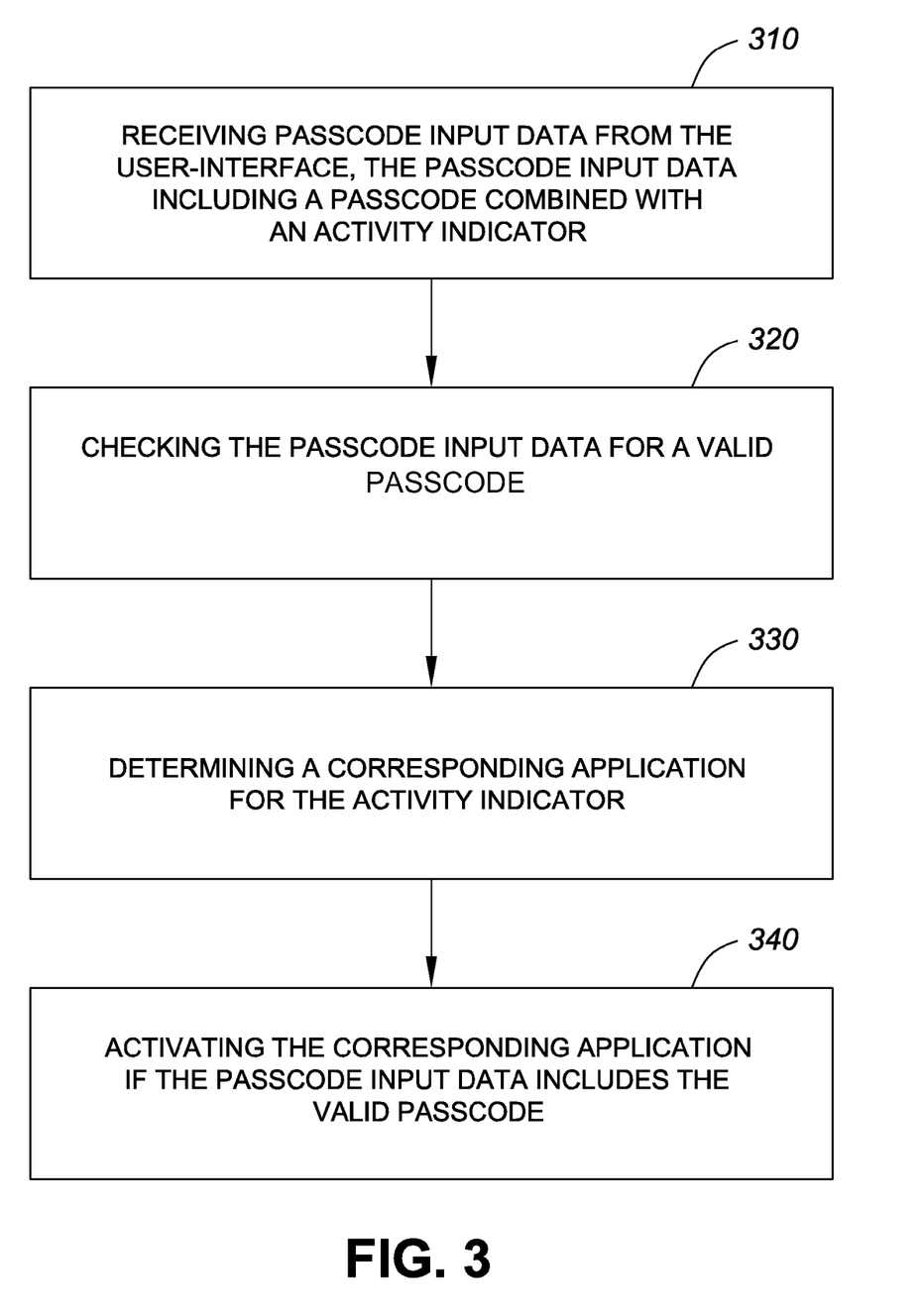
FIG. 3 is a flowchart of a method in accordance with one example embodiment of the present disclosure.

Referring now to FIG. 3, a method of activating an application on an electronic device will be described. At action 310 the method starts with receiving passcode input data from a user-interface, the passcode input data including a passcode combined with an activity launch modifier. Then at action 320, the method continues with checking the passcode input data for a valid passcode. The next action 330 is determining a corresponding application for the activity launch modifier. The method ends with action 340 which is activating the corresponding application if the passcode input data includes the valid passcode.

In an embodiment, activating the corresponding application comprises activating a portion of the application corresponding to the activity launch modifier. Thus, activating the application in some cases is opening the application such that the user can navigate from a default start point in the application. In other cases, a particular the application is opened to a particular subroutine or menu item. For example, if the corresponding application is an email application, a new compose email window can be opened. In an embodiment, activating the corresponding application comprises implementing an action within the application corresponding to the activity launch modifier. Thus, in some embodiments, the corresponding application is instructed to perform a particular action. For example, if the application is a phone application, the action could be to dial a particular phone number. For the email application example previously given, the compose email window can have the addressee information filled out. Another non-limiting example is for a map application whereby the action could be to find a current location.

In some embodiments, checking for the valid passcode comprises determining if the valid passcode appears anywhere in the passcode input data. Thus, in the case of an alphanumeric code, the valid passcode could appear anywhere in the character string: at the beginning, in the middle or at the end. The passcode could feasibly comprise the entire passcode. In other words, there may be situations where no activity launch modifier is entered. Thus, where no activity launch modifier is found when checking for the activity launch modifier, entering a valid passcode can result in positive authentication with a default action, such as unlocking the electronic device.

In some embodiments, the passcode input data comprises a character string and checking for the valid passcode comprises determining if the valid passcode appears starting at the beginning of the character string. In some embodiments, checking for the activity launch modifier comprises determining if an additional character appears in the character string after the valid passcode.

In some embodiments, the passcode input data comprises a character string and checking for the valid passcode comprises determining if the valid passcode appears at the end of the character string. In some embodiments, checking for the activity launch modifier comprises determining if an additional character appears in the character string before the valid passcode.

In some embodiments, the valid passcode is a graphical authentication passcode and the activity launch modifier is a gesture. In some embodiments, such as the Clixel™ example given above, the valid passcode requires alignment on a display of a first reference point on an overlay image with a second reference point on a base image. A gesture can be used as the activity launch modifier. In cases where a touch screen or a touch pad is used as an input interface, gestures are convenient activity launch modifiers.

In some embodiments where the valid passcode requires alignment on a display of a first reference point on an overlay image with a second reference point on a base image, the activity launch modifier is a manner of aligning the first reference point and the second reference point.

In some embodiments, the activity launch modifier is a selectable modifier displayed on a display. For example, in some embodiments, instead of hitting enter after entering a passcode, a user can select the modifier to go directly to an activity within an application.

In some embodiments, the user holds down a key or touches a touchscreen while one or more images changes on a display or portions of the display change. The changing images or portions of the display represent activity launch modifiers. Releasing the key when a particular activity launch modifier is displayed will start the activity if the passcode is entered correctly. For example, in some embodiments, the activity launch modifier is a colour of at least a portion of a display. For example, at some point in entering a passcode, graphic or alpha-numeric, the user may hold down a key or touch a touchscreen until the portion of the display turns the color associated with the action desired.

In some embodiments, the methods described herein are implemented by a processor. In one aspect, there is provided a computer readable medium having computer readable instructions stored thereon that when implemented cause a processor to implement any of the methods described herein.

Figure 4:
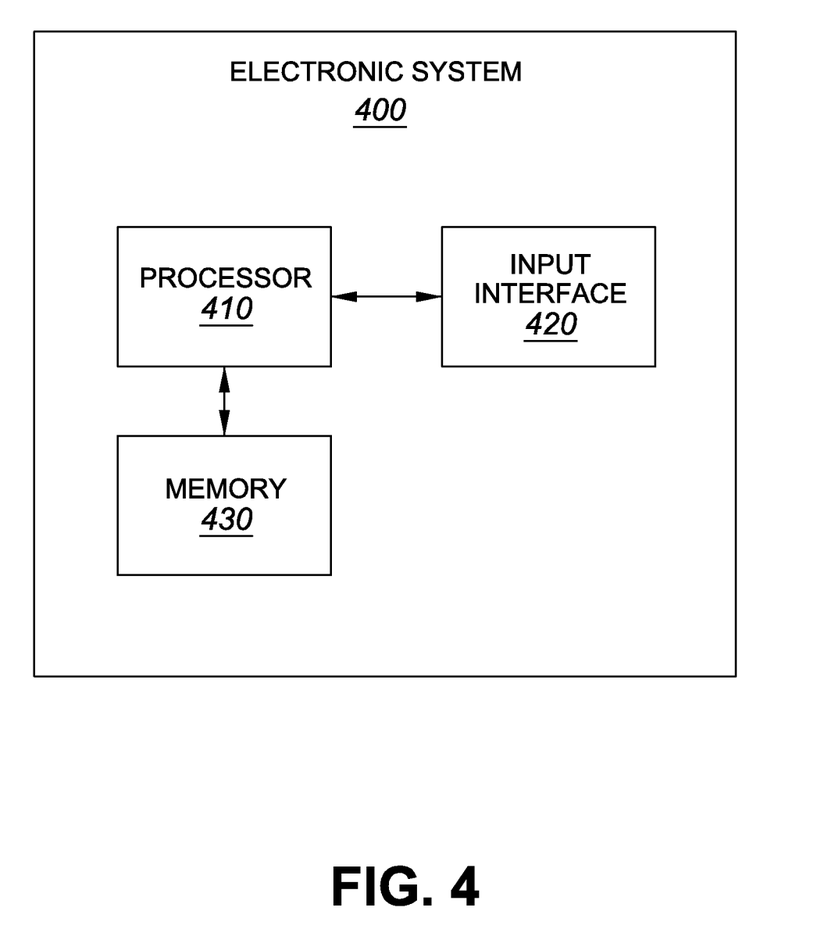
FIG. 4 is a block diagram of a system in accordance with one example embodiment of the present disclosure.

Referring now to FIG. 4, an electronic system 400 will be described. The electronic system comprises a processor 410, an input interface 420 and a memory 430. The memory 430 has computer readable instruction stored thereon that when executed cause the processor to implement a method of activating an application according to any of the embodiments described herein. In some embodiments, the input interface 420 is a touch screen display. Other non-limiting examples of the input interface include a keyboard, a touch pad, and a joystick. In some embodiments, at least a portion of the electronic system 400 is a mobile electronic device, such as but not limited to the mobile electronic device 201 described with reference to FIG. 1. In some embodiments, the electronic system is one device. In some embodiments, the electronic system is composed of separate devices. For example, the input interface 420 and the memory 430 can be peripheral devices that are connectable to another device housing the processor 410.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a prerecorded storage device or other similar computer readable medium including program instructions recorded thereon may direct an apparatus to facilitate the practice of the described methods. It is understood that such apparatus and articles of manufacture, also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of activating an application on an electronic device when the electronic device is in a locked state, the method comprising:
displaying, on a display of the electronic device, a first image and a second image, the second image overlaying the first image, the first image having a first reference point and the second image having a second reference point;
receiving input, via an input device of the electronic device; and
when the first reference point of the first image is substantially aligned with the second reference point of the second image in combination with receiving an activity launch modifier as input, unlocking the electronic device and activating an application corresponding to the activity launch modifier.

2. The method of claim 1, further comprising:
when the first reference point of the first image is substantially aligned with the second reference point of the second image and no activity launch modifier is received, unlocking the electronic device.

3. The method of claim 1, wherein the activity launch modifier includes a gesture.

4. The method of claim 1, wherein the activity launch modifier includes a manner in which the first reference point is substantially aligned with the second reference point.

5. The method of claim 1, wherein the activity launch modifier includes selection of a selectable modifier displayed on the display.

6. The method of claim 1, wherein activating the corresponding application comprises activating a portion of the application corresponding to the activity launch modifier.

7. The method of claim 1, wherein activating the corresponding application comprises implementing an action within the application corresponding to the activity launch modifier.

8. An electronic device, comprising:
a processor;
a display and an input device coupled to the processor;
a memory coupled to the processor, the memory having machine readable instructions stored thereon for activating an application when the electronic device is in a locked state, which when executed by the processor, cause the processor to:
display, on the display of the electronic device, a first image and a second image, the second image overlaying the first image, the first image having a first reference point and the second image having a second reference point;
receive input, via the input device of the electronic device; and
when the first reference point of the first image is substantially aligned with the second reference point of the second image in combination with receiving an activity launch modifier as input, unlock the electronic device and activate an application corresponding to the activity launch modifier.

9. The electronic device of claim 8, wherein the machine readable instructions, when executed by the processor, cause the processor to:
when the first reference point of the first image is substantially aligned with the second reference point of the second image and no activity launch modifier is received, unlocking the electronic device.

10. The electronic device of claim 8, wherein the activity launch modifier includes a gesture.

11. The electronic device of claim 8, wherein the activity launch modifier includes a manner in which the first reference point is substantially aligned with the second reference point.

12. The electronic device of claim 8, wherein the activity launch modifier includes selection of a selectable modifier displayed on the display.

13. A non-transitory machine readable medium having machine readable instructions tangibly stored thereon for activating an application on an electronic device when the electronic device is in a locked state, which when executed by a processor of the electronic device, cause the processor to:
display, on a display of the electronic device, a first image and a second image, the second image overlaying the first image, the first image having a first reference point and the second image having a second reference point;
receive input, via an input device of the electronic device; and
when the first reference point of the first image is substantially aligned with the second reference point of the second image in combination with receiving an activity launch modifier as input, unlock the electronic device and activate an application corresponding to the activity launch modifier.

14. The non-transitory machine readable medium of claim 13, wherein the machine readable instructions, when executed by the processor, cause the processor to:
when the first reference point of the first image is substantially aligned with the second reference point of the second image and no activity launch modifier is received, unlocking the electronic device.

15. The non-transitory machine readable medium of claim 13, wherein the activity launch modifier includes a gesture.

16. The non-transitory machine readable medium of claim 13, wherein the activity launch modifier includes a manner in which the first reference point is substantially aligned with the second reference point.

17. The non-transitory machine readable medium of claim 13, wherein the activity launch modifier includes selection of a selectable modifier displayed on the display.

* * * * *